July 15, 1969  D. L. CUMMINS ET AL  3,456,182
POTENTIAL REGULATOR CIRCUIT
Filed Oct. 7, 1966
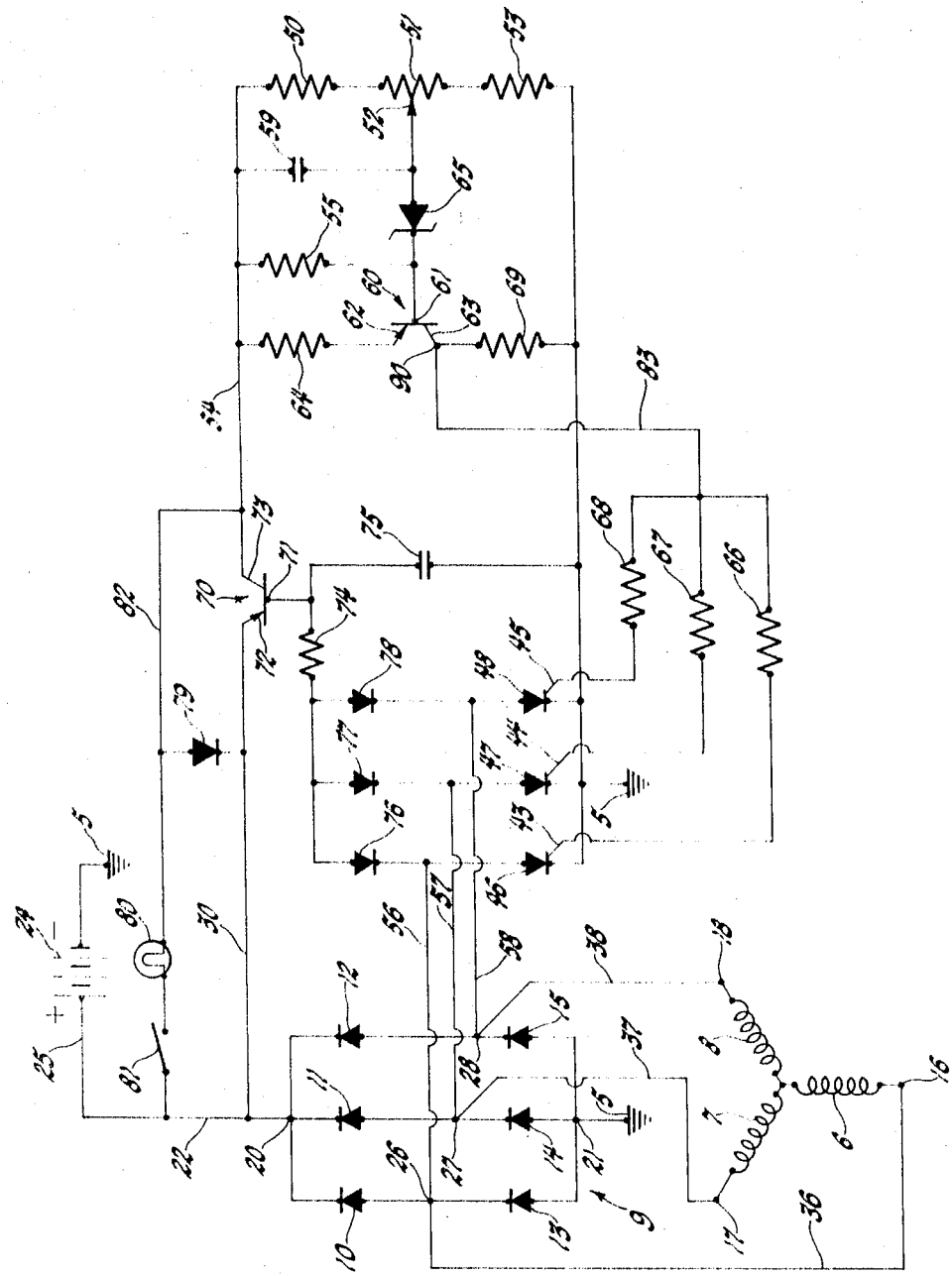
INVENTORS
*Donald L. Cummins &*
BY *Gerald H. Stenklyft*
*Richard G. Stahl*
ATTORNEY

United States Patent Office 3,456,182
Patented July 15, 1969

3,456,182
POTENTIAL REGULATOR CIRCUIT
Donald L. Cummins and Gerald H. Stenklyft, Anderson, Ind., assignors to General Motors Corporation, Detroit, Mich., a corporation of Delaware
Filed Oct. 7, 1966, Ser. No. 585,024
Int. Cl. H02h 7/06
U.S. Cl. 322—28                                     2 Claims

ABSTRACT OF THE DISCLOSURE

A potential regulator circuit for regulating the system output potential of an electrical generating system employing an alternator. A potential sensitive circuit, connected across the system output circuit, produces a control signal when the system potential exceeds a predetermined maximum which triggers silicon controlled rectifiers conductive to complete an electrical circuit between the output coils of the alternator, thereby essentially short circuiting the alternator. To prevent undesirable battery drain, the circuit also includes a "turn-on" circuit responsive to generated potential for energizing the potential sensitive circuitry only while the generator is generating an output potential.

---

The present invention relates to potential regulator circuits and, more specifically, to a potential regulator circuit suitable for use with permanent magnet type alternators.

With dynamoelectric machines which depend upon current flowing through a field coil or winding for producing the necessary magnetic field, it is a common expedient to alter the amount of current flow through the field coil in response to changes of system potential magnitude for purposes of regulating the output potential of the machine. Permanent magnet type alternators, however, present a different regulating problem in that permanent magnet units provide the necessary magnetic field, therefore, machines of this type are not adaptable to potential regulator circuits or arrangements which operate to alter field coil current.

As alternators of the permanent magnet type offer certain advantages from the standpoint of cost and reliability over the field coil type, the requirement of a reliable and inexpensive potential regulator circuit or arrangement suitable for use with dynamoelectric machines of the permanent magnet type, is apparent.

It is, therefore, an object of this invention to provide an improved potential regulator circuit.

It is another object of this invention to provide an improved potential regulator circuit suitable for use with permanent magnet type alternators.

In accordance with this invention, a potential regulator circuit suitable for use with permanent magnet type alternators is provided wherein an electrical circuit is established between the alternator output circuitry in response to a control signal produced by a potential sensitive circuit arrangement when the system potential exceeds a predetermined maximum thereby substantially short circuiting the alternator output coils.

For a better understanding of the present invention, together with additional objects, advantages and features thereof, reference is made to the following description and accompanying single figure drawing in which an embodiment of the regulator circuit of this invention is schematically set forth.

For purposes of illustrating the features of the novel regulating circuit of this invention and without intention or in inference of a limitation thereto, the operation will be described in combination with a three phase permanent magnet type alternator. The alternating current output coils of a three phase permanent magnet type alternator are schematically illustrated in the figure as Y connected stator coils 6, 7 and 8 which also may be connected in a delta configuration. A magnetic field produced by a permanent magnet or magnets, not shown, moves relative to these coils and generates a three phase potential therein in a manner well known in the art.

To convert the three phase alternating current potential generated in stator coils 6, 7 and 8 to a rectified direct current system potential, a rectifier circuit, generally shown at 9, is provided. In the figure, rectifier circuit 9 is illustrated as a three phase bridge type full-wave rectifier circuit having three diodes 10, 11 and 12 in the positive polarity bank and three diodes 13, 14 and 15 in the negative polarity bank.

The alternating current potentials generated in stator coils 6, 7 and 8 appear across the alternator alternating current output circuitry, which may be respective terminals 16, 17 and 18 or any other electrical device or arrangement which provides for an electrical connection to external circuitry. Stator coils 6, 7 and 8 are connected to respective alternating current input circuit terminals or junctions 26, 27 and 28 of rectifier circuit 9 through respective alternating current output circuit terminals 16, 17 and 18 and leads 36, 37 and 38.

The three phase alternating current potentials generated in stator coils 6, 7 and 8 are full wave rectified by rectifier circuit 9 and appears as system potential across positive polarity direct current output circuit junction 20 and negative polarity direct current output circuit junction 21, which may be terminals or any other suitable electrical device or arrangement which provides for an electrical connection to external circuitry, of rectifier circuit 9. Positive polarity junction 20 may be connected to positive polarity line 22 and negative polarity junction 21 may be connected to point of reference or ground potential 5 which, since it is the same point electrically throughout the system, has been referenced by the same numeral throughout the figure. The system potential may be employed to charge a conventional storage battery 24 connected across the system output circuitry through lead 25 and point of reference or ground potential 5 and poled as shown.

To establish an electrical circuit between the alternating current output circuitry of the alternator with overpotential conditions thereby substantially short circuiting the output coils of the alternator when system potential exceeds a predetermined maximum, a controllable switching device having two current carrying electrodes and a control electrode of the type which may be triggered conductive upon the application of a control signal to the control electrode thereof corresponding to each alternating current output circuit terminal of the alternator is provided. Without intention or inference of a limitation thereto, these controllable switching devices have been illustrated in the figure as silicon controlled rectifiers 46, 47 and 48, corresponding to respective alternating current output terminals 16, 17 and 18, each having a respective control electrode 43, 44 and 45. The current carrying electrodes of each of silicon controlled rectifiers 46, 47 and 48 are connected across the corresponding alternating current output circuit terminals of the alternator, through respective leads 56 and 36, 57 and 37 and 58 and 38, and point of reference or ground potential 5. It is to be specifically understood that alternate controllable switching devices having similar electrical characteristics may be substituted for silicon controlled rectifiers 46, 47 and 48 without departing from the spirit of the invention.

The silicon controlled rectifier is a semiconductor device having a control electrode, generally termed the gate electrode, and two current carrying electrodes, generally termed the anode and cathode electrodes, which is designed to normally block current flow in either direction. With the anode and cathode electrodes forward poled, anode positive and cathode negative, the silicon controlled rectifier may be triggered conductvie upon the application to the control electrode of a control signal of a polarity which is positive with respect to the potential present upon the cathode electrode and of a sufficient magnitude to produce control electrode-cathode current. To extinguish a conducting silicon controlled rectifier, the anode-cathode circuit may be interrupted or the polarity of the potential applied across the anode-cathode electrodes may be reversed.

To produce the control signal in response to system potential exceeding a predetermined maximum, a potential sensitive circuit arrangement is connected across the system output circuitry and comprises a potential divider network, resistor 50, potentiometer 51 having a movable contact 52 and resistor 53, a type PNP transistor 60, having a base electrode 61, an emitter electrode 62 and a collector electrode 63, and a Zener diode 65. An alternate transistor type may also be employed with compatible electrical polarities.

So that the potential sensitive circuitry just described may be energized only while the alternator is generating an alternating current output potential, a turn-on circuit may be provided which comprises type PNP transistor 70, having a base electrode 71, an emitter electrode 72 and a collector electrode 73, diodes 76, 77 and 78, resistor 74, capacitor 75 and diode 79. The current carrying electrodes, emitter electrode 72 and collector electrode 73, of transistor 70 are connected in series between direct current output circuit terminal 20 of rectifier circuit 9 and the potential sensitive circuit arrangement previously described. While the emitter-collector electrodes of transistor 70 are shown in the figure to be connected between direct current output circuit terminal 20 of rectifier circuit 9 and the potential sensitive circuitry, it is to be specifically understood that the emitter-collector electrodes of the turn-on transistor may be connected in series between direct current output circuit terminal 21 of rectifier circuit 9 and the potential sensitive circuitry with other applications.

As the emitter electrode 72 of type PNP transistor 70 is connected to the positive polarity direct current output terminal 21 of rectifier circuit 9 and the collector electrode 73 thereof is connected to the negative polarity direct current output terminal 21 of rectifier circuit 9 through lead 54, the potential divider network of the potential sensitive circuitry and point of reference or ground potential 5, this type PNP transistor is forward poled.

The parallel combination of the potential divider network, resistor 50, potentiometer 51 and resistor 53, and the current carrying electrodes, emitter electrode 62 and collector electrode 63, of type PNP transistor 60 and series resistors 64 and 69 of the potential sensitive circuitry is connected across the direct current output terminals 20 and 21 of rectifier circuit 9 through lead 54, the collector-emitter electrodes of turn-on transistor 70 and lead 30, and point of reference or ground potential 5, and Zener diode 65 is connected between movable contact 52 of potentiometer 51 and base electrode 61 of transistor 60 and reverse poled. In this circuit, resistor 55 is a base bias resistor and capacitor 59 is a filter capacitor.

As the emitter electrode 62 of type PNP transistor 60 is connected to the positive polarity direct current output terminal 20 of rectifier circuit 9 through feedback resistor 64, lead 54, the collector-emitter electrodes of turn-on transistor 70 and lead 30, and the collector electrode 63 thereof is connected to the negative polarity direct current output terminal of rectifier circuit 9 through collector resistor 69 and point of reference or ground potential 5, this type PNP transistor is forward poled.

To apply the control signal produced by the potential sensitive circuitry, in a manner to be later explained, to the control electrodes of silicon controlled rectifiers 46, 47 and 48, one end of each of equalizing resistors 66, 67 and 68 is connected to the collector electrode 63 of transistor 60 through lead 83 and the opposite end of each of these resistors is connected to a respective control electrode 43, 44 and 45 of a respective silicon controlled rectifier 46, 47 and 48.

Connected between each of the alternating current output terminals 16, 17 and 18 of stator coils 6, 7 and 8 and the base electrode 71 of turn-out transistor 70 is a respective diode 76, 77 and 78 through respective leads 36 and 56, 37 and 57 and 38 and 58, and resistor 74.

An electric lamp 80 may be connected across the parallel combination of positive polarity direct current output terminal 20 of rectifier circuit 9 and battery 24 through switch 81, lead 82, lead 54, the potential divider network of the potential sensitive circuit previously described and point of reference or ground potential 5. While turn-on transistor 70 is nonconductive, lamp 80 is energized by battery 24 through the circuitry just described and is, therefore, illuminated. However, with turn-on transistor 70 conducting, in response to the alternating current potential generated in stator coils 6, 7 and 8, lamp 80 is short circuited by the emitter-collector electrodes of transistor 70 connected in parallel thereacross and is, therefore, extinguished. Lamp 80 provides a visible indication that an alternating current potential is or is not being generated in the alternator stator coils 6, 7 and 8. Diode 79 is included in this circuit to clip the negative potential peaks which appear at the emitter electrode 72 of turn-on transistor 70 should the system be operated without a battery or should the battery become inadvertently disconnected.

When an alternating current potential is generated in stator coils 6, 7 and 8, a pulsating negative polarity potential is developed at the anode electrodes of diodes 76, 77 and 78 which is filtered by the resistor 74-capacitor 75 network and applied to the base electrode 71 of turn-on transistor 70. As this potential is of the proper polarity to produce emitter-base current flow through a type PNP transistor, emitter-base current flows through turn-on transistor 70 through a circuit which may be traced from an output terminal 16, 17 or 18 which is of a positive polarity, through the corresponding diode in the positive polarity bank of rectifier circuit 9, the emitter-base junction of turn-on transistor 70, through the conducting one or more of diodes 76, 77 and 78 to the output terminal or terminals 16, 17 and 18 which is of a negative polarity. Therefore, with an alternating current potential generated in stator coils 6, 7 and 8, turn-on transistor 70 is conducting, a condition which energizes the potential sensitive circuit arrangement and short circuits indicator lamp 80.

With turn-on transistor 70 conducting, the system potential, which appears across output circuit terminals 20 and 21 of rectifier circuit 9, is applied across the potential divider network of the potential sensitive circuitry and a proportional amount of system potential, as determined by the setting of movable contact 52 of potentiometer 51, is applied in a reverse polarity relationship across Zener diode 65 through the emitter-base junction of transistor 60.

The maximum system potential, as determined by the external electrical circuitry or components with which the potential generating system is to be employed, is selected. Zener diode 65 is selected to have an inverse breakdown potential rating substantially equal to that proportion of the system potential which appears thereacross, as determined by the setting of movable contact 52 of potentiometer 51, with the system potential across the potential divider network being substantially equal to the selected predetermined maximum.

The regulating circuit arrangement of this invention regulates the system potential of generating systems employing permanent magnet type alternators in a manner now to be explained.

Assuming that the magnitude of system potential appearing across positive polarity line 22 and point of reference or ground potential 5 remains substantially equal to or less than the selected predetermined maximum, Zener diode 65 remains nonconductive and interrupts the emitter-base circuit of transistor 60, therefore, this device is normally not conducting. With transistor 60 in the nonconducting state, the potential of junction 90 is substantially ground, therefore, a control signal is not produced by the potential sensitive circuitry with normal system potential conditions.

Should the magnitude of the system potential appearing across positive polarity line 22 and point of reference or ground potential 5 increase above the selected predetermined maximum, Zener diode 65 breaks down and conducts in a reverse direction to complete a circuit for the flow of current through the emitter-base junction of type PNP transistor 60, thereby triggering this device to conduction. With transistor 60 conducting, the normal rectifier ripple appearing at terminal 20 appears as a control signal across collector resistor 69 and may be taken from junction 90 and applied to the control electrodes 43, 44 and 45 of respective silicon controlled rectifiers 46, 47 and 48.

Conducting transistor 60 establishes a circuit for control of electrode-cathode current flow through each of silicon controlled rectifiers 46, 47 and 48 which may be traced from positive polarity line 22, through lead 30, the emitter-collector electrodes of turn-on transistor 70, lead 54, resistor 64, the emitter-collector electrodes of transistor 60, lead 83, through each of parallel connected equalizing resistors 66, 67 and 68 and through the control electrode-cathode junction of the corresponding silicon controlled rectifier devices 46, 47 and 48 to point of reference or ground potential 5.

As an alternating current potential is induced in each of stator coils 6, 7 and 8, the potential of the terminal end of each of these coils passes through positive and negative polarity excursions, with respect to point of reference or ground potential 5, during each alternating current potential cycle. With the presence of the control signal upon the control electrodes 43, 44 and 45 of respective silicon controlled rectifiers 46, 47 and 48, therefore, each of these devices is triggered conductive as it becomes forward poled during each positive polarity excursion of the potential of the terminal end of the corresponding stator coil and is extinguished as it becomes reverse poled during each negative polarity excursion of the potential of the terminal end of the corresponding stator coil.

With silicon controlled rectifiers 46, 47 and 48 conducting as each becomes forward poled, a circuit is established between the output circuit terminals 16, 17 and 18 of the alternator which provides an electrical path which substantially short circuits the stator coils. This circuit includes the parallel combination of silicon controlled rectifiers 46, 47 and 48, in series with point of reference or ground potential 5 and the conducting diode or diodes of the negative polarity bank of rectifier circuit 9. With silicon controlled rectifiers 46, 47 and 48 conducting, therefore, stator coils 6, 7 and 8 are substantially short circuited and the resulting heavy current flow through the stator coils produces a high internal potential drop, thereby reducing the system potential.

When the magnitude of the system potential has decreased below the selected predetermined maximum, Zener diode 65 ceases to conduct, thereby interrupting the circuit which provides emitter-base current flow through transistor 60, a condition which quickly extinguishes this device. With transistor 60 extinguished, the control signal is removed from the control electrodes 43, 44 and 45 of respective silicon controlled rectifiers 46, 47 and 48. Therefore, after each of silicon controlled rectifiers 46, 47 and 48 has been extinguished by the reverse polarity potential applied across the current carrying electrodes thereof during each negative polarity excursion of the potential of the terminal end of the corresponding stator coil, it is not re-ignited during the next positive polarity excursion of the potential of the terminal end of the corresponding stator coil and the system again operates in the normal manner.

This invention has been described in reference to the full wave rectification of a three phase alternating current potential generated by a permanent magnet type alternator. It is to be specifically understood that the novel circuit of this invention is equally applicable for use with field coil type alternators and with full or half-wave rectification of more or less alternating current phases and is not to be construed as limited to the specific embodiment set forth in the figure. With half wave rectification, of course, fewer unidirectional current translating devices are required in the rectifier circuitry and with more or less phases, more or less unidirectional current translating devices may be required. In fact, the regulating arrangement of this invention may be employed with a half-wave rectifier circuit employing only a single controllable unidirectional current translating device having electrical characteristics similar to that of the silicon controlled rectifier illustrated in the figure.

While a preferred embodiment of the present invention has been shown and described, it will be obvious to those skilled in the art that various modifications and substitutions may be made without departing from the spirit of the invention which is to be limited only within the scope of the appended claims.

What is claimed is:

1. A potential regulator circuit for regulating the system potential of an electrical generating system employing an alternator having alternating current output circuit means across which the generated alternating current potential appears comprising, a controllable switching device having two current carrying electrodes and a control electrode of the type which may be triggered conductive upon the application of a control signal to the control electrode thereof corresponding to each said alternating current output circuit means, a rectifier circuit having direct current output circuit means for rectifying the output potential of said alternator, a transistor having base, emitter and collector electrodes, a potential sensitive circuit means connected across said rectifier direct current output circuit means for producing a control signal in response to system potentials exceeding a predetermined maximum, means for connecting said emitter-collector electrodes of said transistor in series between a selected one of said rectifier direct current output circuit means and said potential sensitive circuit means, a diode connected between each of said alternating current output circuit means and said base electrode, means for connecting said current devices between the corresponding said alternating current output circuit means and a point of system reference potential and means for applying said control signal to the said control electrode of each of said controllable switching devices.

2. A potential regulator circuit for regulating the system potential of an electrical generating system employing an alternator having alternating current output circuit means across which the generated alternating current potential appears comprising, system output circuit means across which system potential appears, a potential sensitive circuit means connected across said system output circuit means for producing a control signal in response to system potential exceeding a predetermined maximum, a turn-on circuit means responsive to the generated alternating current potential of said alternator for energizing said potential sensitive circuit means only while said alternator is generating an output potential, and means responsive to said control signal for establishing an electrical circuit between said alternating current output circuit means thereby substantially short circuiting the output coils of said alternator when said system potential exceeds a predetermined maximum.

References Cited
UNITED STATES PATENTS

| | | | |
|---|---|---|---|
| 3,137,811 | 6/1964 | Kirk | 322—28 X |
| 3,260,917 | 7/1966 | Shimwell et al. | 321—18 |

ORIS L. RADER, Primary Examiner

H. HUBERFELD, Assistant Examiner

U.S. Cl. X.R.

320—71; 322—36, 91

PO-1050
(5/69)

UNITED STATES PATENT OFFICE
CERTIFICATE OF CORRECTION

Patent No. 3,456,182      Dated July 15, 1969

Inventor(s) Donald L. Cummins and Gerald H. Stenklyft

It is certified that error appears in the above-identified patent and that said Letters Patent are hereby corrected as shown below:

Column 4, line 12, "turn-out" should be -- turn-on --; line 49, after "77" change "and" to -- or --; line 50, after "17" change "and" to -- or --.

Column 6, claim 1, line 54, after "current" insert -- carrying electrodes of each of said controllable switching --.

SIGNED AND
SEALED
MAR 24 1970

(SEAL)
Attest:

Edward M. Fletcher, Jr.
Attesting Officer

WILLIAM E. SCHUYLER, JR.
Commissioner of Patents